(12) United States Patent  
Kamiyama et al.

(10) Patent No.: US 7,430,050 B2
(45) Date of Patent: Sep. 30, 2008

(54) STAGE APPARATUS AND VISION MEASURING APPARATUS

(75) Inventors: Shuichi Kamiyama, Kawasaki (JP); Yutaka Nishitsuji, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 365 days.

(21) Appl. No.: 11/147,385

(22) Filed: Jun. 8, 2005

(65) Prior Publication Data

US 2005/0275803 A1  Dec. 15, 2005

(30) Foreign Application Priority Data

Jun. 11, 2004 (JP) ............... 2004-174353

(51) Int. Cl.
*G01B 11/14* (2006.01)
*G01B 11/28* (2006.01)
(52) U.S. Cl. ...................... 356/625; 356/628
(58) Field of Classification Search ........ None
See application file for complete search history.

(56) References Cited

U.S. PATENT DOCUMENTS 4,654,762 A  3/1987  Laverick

2003/0011898 A1  1/2003  Mai et al.
2003/0053045 A1*  3/2003  Doering ............... 356/237.1

FOREIGN PATENT DOCUMENTS

| EP | 0 324 561 A2 | 7/1989 |
| EP | 1 022 541 A2 | 7/2000 |
| JP | A 9-33207 | 2/1997 |
| JP | A 2000-147171 | 5/2000 |
| JP | A 2001-41711 | 2/2001 |
| JP | A 2002-207004 | 7/2002 |

* cited by examiner

*Primary Examiner*—Gregory J. Toatley, Jr.
*Assistant Examiner*—Amanda H Merlino
(74) *Attorney, Agent, or Firm*—Oliff & Berridge, PLC

(57) ABSTRACT

A stage apparatus (100) includes a stage glass (210) having on an upper surface a stage surface (211) of a substantially flat plane on which a predetermined workpiece (W) is set, a plane light emitter (220) with a flat plane, which is provided to substantially all over a lower surface of the stage glass (210) and illuminates the workpiece (W) with contour illumination through the stage glass (210), and a supporting section (300), which supports at plurality of points on a lower face side of the plane light emitter (220) and adjusts the flatness of the stage surface (211) by adjusting the height at a plurality of supporting points.

8 Claims, 8 Drawing Sheets

STAGE APPARATUS AND VISION MEASURING APPARATUS

BACKGROUND OF THE INVENTION

1. Field of the Invention

The present invention relates to a stage apparatus and a vision measuring apparatus, in particular to a stage apparatus and the like used, for example, for a vision measuring apparatus, which measures contour, dimensions etc. of an object to be measured based on image data obtained by imaging the object, and illuminates the object with contour illumination.

2. Description of Related Art

Conventionally, such a vision measuring apparatus that measures contour and dimensions of an object to be measured based on images obtained by imaging the object has been known (refer to, for example, Document; JP2001-41711A).

Figure 8:
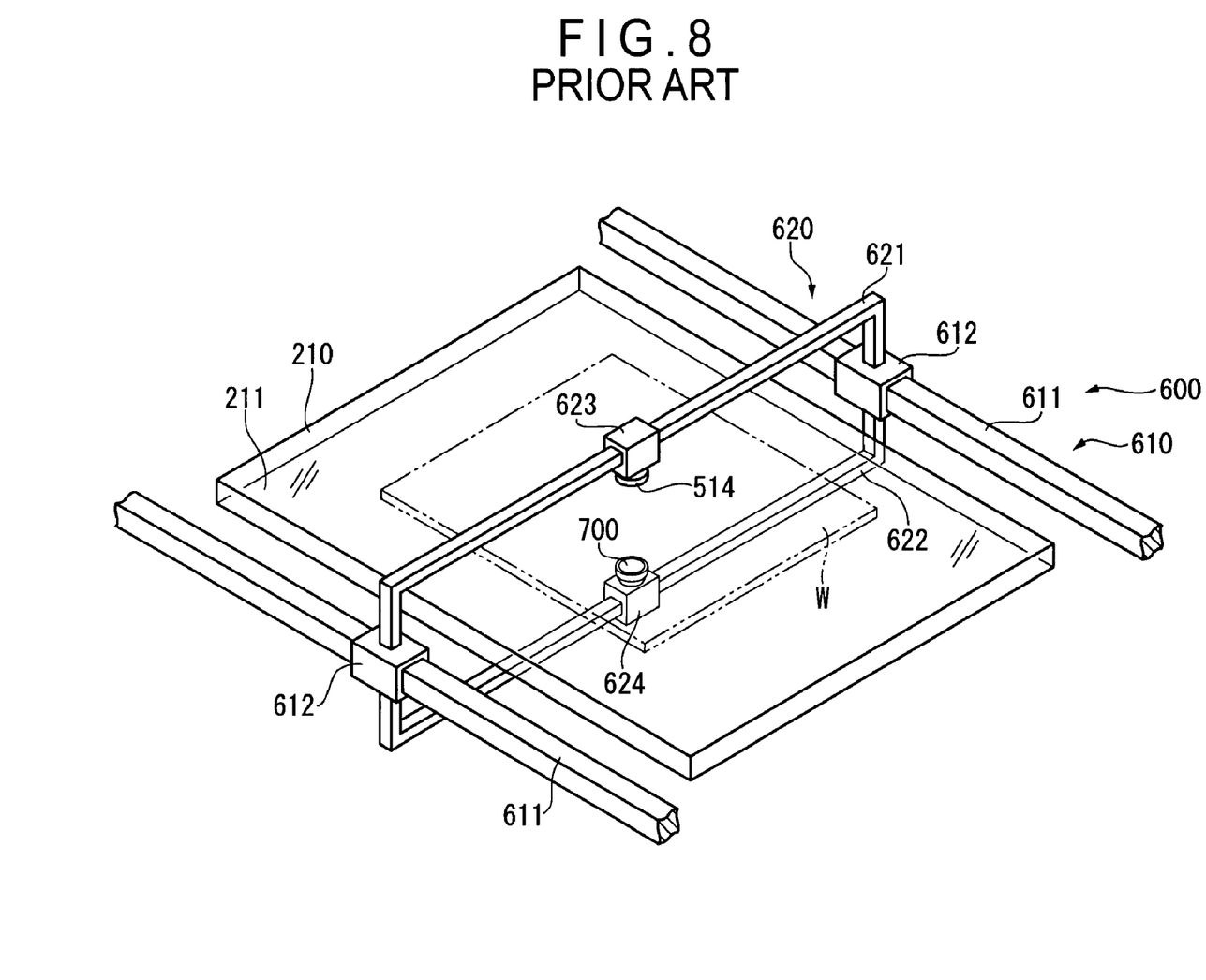
FIG. 8 is an illustration showing a part of a conventional vision measuring apparatus.

Such a vision measuring apparatus includes, for example, as shown in FIG. 8, a stage glass 210 as a stage for setting an object W to be measured thereon, an imaging device 514 for imaging the object W, an illuminator 700 that performs contour illumination against the object W through the stage glass 210, a movement mechanism 600 for moving the imaging device 514 and the illuminator 700 in accordance with the portion to be measured of the object W and an analyzing unit (not shown) for analyzing and processing images taken by the imaging device 514.

The stage glass 210 has a stage surface 211 on which an object W to be measured is set, and the stage surface 211 is formed into a flat plane free from unevenness, waviness or the like.

A movement mechanism 600 is equipped with a Y-movement mechanism 610 that moves the imaging device 514 and the illuminator 700 along the Y-direction, which is one of the parallel direction to the stage surface 211 of the stage glass 210, and an X-movement mechanism 620 that moves the imaging device 514 and the illuminator 700 along the X-direction, which is parallel to the stage surface 211 and perpendicular to the Y-direction.

The Y-movement mechanism 610 is equipped with Y-axis guides 611, 611, which are disposed parallel to each other within a flat plane parallel to the stage surface 211 interposing the stage glass 210, and Y-sliders 612, 612 arranged in slidable manner on each of the Y-axis guides 611, 611.

The X-movement mechanism 620 is equipped with a first X-axis guide 621 of which both legs are fixedly attached to the Y-sliders 612, 612, and are disposed parallel to the stage glass 210 facing the stage surface 211 side of the stage glass 210, a second X-axis guide 622 of which both legs are fixedly attached to the Y-sliders 612, 612 and are disposed parallel to the stage glass 210 facing at the opposite side of the stage surface 211 of the stage glass 210, a first X-slider 623 mounted in slidable manner on the first X-axis guide 621 and a second X-slider 624 mounted in slidable manner on the second X-axis guide 622.

The imaging device 514 is attached to the first X-slider 623, and the illuminator 700 is attached to the second X-slider 624.

In configuration as described above, a display-panel, for example, is set on the stage surface 211 of the stage glass 210 as an object W to be measured. The imaging device 514 and the illuminator 700 are moved by the Y-movement mechanism 610 and the X-movement mechanism 620 in accordance with the portion to be measured. While performing contour illumination by the illuminator 700, images of the object W are taken by the imaging device 514. Then, an analyzing unit (not shown) analyzes the images based on the image data, and the contour and dimensions of the object W are measured.

Recently, the size of the object W is getting larger. For example, a display panel as an object W has 2500 mm×2500 mm in size. The size of the stage glass 210 for setting such a large object W also has to be made larger.

However, if the stage glass 210 is simply made larger, flexure is generated due to its own weight. For example, in a glass of 25 mm in thickness and 2500 mm×2500 mm in size, the flexure due to its own weight reaches to an extent of 0.8 mm to 1.8 mm. When the stage glass 210 deflects as described above, the object W also deflects; thus, there resides such a problem that the measurement is hardly carried out precisely.

Here, in order to adjust such flexure of the stage glass 210, it is conceivable to support the lower surface of the stage glass 210 using, for example, jacks. However, in this case, the jacks block movement of the illuminator 700 bringing about areas out of reach and thus areas with no illumination are generated.

Therefore, an arrangement for measuring a large object W using the contour illumination has been strongly demanded.

SUMMARY OF THE INVENTION

An object of the present invention is to provide a stage apparatus and a vision measuring apparatus, which is capable of maintaining the flatness of a stage surface as well as permitting upsizing.

A stage apparatus according to an aspect of the present invention includes: a light transmittance plate having on an upper surface side a stage surface of a substantially flat plane on which a predetermined workpiece is set; a plane light emitter having a flat plane provided to substantially all over a lower surface of the light transmittance plate to illuminate the workpiece with contour illumination through the light transmittance plate; and a flatness adjuster that supports a lower face side of the plane light emitter at a plurality of points and adjusts the flatness of the stage surface by adjusting the height at a plurality of supporting points.

Owing to this configuration, the flatness adjuster adjusts the flatness of the stage surface. Accordingly, the stage surface is always maintained to be flat. For example, when images of a workpiece set on the stage surface are taken and measured, the measurement accuracy is improved.

Conventionally, to carry out contour illumination, an illuminator has to be moved. Therefore, a movement mechanism is required at the lower face side of the light transmittance plate.

In the present invention, since the plane light emitter is provided to substantially all over the lower surface of the light transmittance plate, the contour illumination can be performed in substantially all over the light transmittance plate without moving the illuminator. Accordingly, by eliminating the movement mechanism, cost for components and assembly process can be reduced.

Also, by providing the plane light emitter, the movement mechanism for moving the illuminator is eliminated. Accordingly, the flatness adjuster for adjusting the flatness of the light transmittance plate from the lower face side of the light transmittance plate can be installed. Thus, even when the light transmittance plate is upsized, the flatness of the light transmittance plate can be maintained by adjusting the flatness thereof using the flatness adjuster.

For example, the contour illumination can be performed on substantially all over the light transmittance plate while maintaining the flatness of a large sized light transmittance plate having as large as 2500 mm in length for one side. Accordingly, the present invention is extremely suitable for illuminating a large sized display panel or the like with the contour illumination.

Further, since the flatness adjuster is provided, the light transmittance plate does not have to maintain the flatness of the stage surface with the rigidity of its own. Accordingly, the rigidity of the light transmittance plate may be lower, and the thickness of the light transmittance plate may be thinner. As a result, material cost can be reduced.

The light transmittance plate is formed of, for example, an inorganic glass. In addition to this, the light transmittance plate may be formed of, for example, an organic glass consisting of a light transmissive resin (for example, acrylic resin).

Preferably in the above aspect of the present invention, in the stage apparatus, the flatness adjuster may be a plurality of supporters disposed at a plurality of predetermined positions on a lower face side of the plane light emitter and having supports capable of moving in a vertical direction.

Owing to this configuration, by adjusting the height of the lower face side of the plane light emitter at a plurality of predetermined points using the supporters, the flatness of the stage surface can be adjusted to have an even height.

Preferably in the above aspect of the present invention, in the stage apparatus, the flatness adjuster may includes: a plurality of height detectors that detect the height at a plurality of predetermined points on the lower face side of the plane light emitter; and a controller that controls the height at the plurality of predetermined points supporting the lower face side of the plane light emitter based on a detection result by the height detectors.

Owing to this configuration, based on the detection result of the height detectors, the height at the plurality of predetermined points can be controlled to be an even height by the controller. Thus, the flatness of the stage surface is always maintained automatically.

A stage apparatus according to another aspect of the present invention includes: a light transmittance plate having on an upper surface a stage surface of a substantially flat plane on which a predetermined workpiece is set; a plane light emitter having a flat plane provided to substantially all over a lower surface of the light transmittance plate to illuminate the workpiece with contour illumination through the light transmittance plate; and a base plate having a predetermined rigidity provided on an opposite side to the light transmittance plate interposing the plane light emitter.

Owing to this configuration, the base plate gives the rigidity thereof to the light transmittance plate, and the flatness of the stage surface is maintained.

Also, the rigidity given to the light transmittance plate by the base plate can provide an equivalent effect of processing a rigid material surface, and accordingly the stage surface can be processed to a flat plane with a high precision.

Preferably in the above aspect of the present invention, in the stage apparatus, the plane light emitter may be divided into a plurality of parts and light emission is controlled at each of the parts independently.

Owing to this configuration, only the portion (parts) requiring illumination can be made to emit the light. Consequently, compared to the case where the entire surface is illuminated, the power consumption can be reduced. For example, comparing with the case where the entire face as large as 2500 mm×2500 mm is to emit the light, only the necessary portion can be made to emit the light. Accordingly, the power consumption is largely reduced. Particularly, in the case where the plane light emitter is, for example, an EL or the like, to obtain the same luminance, the smaller is the light emitting area the lower is the voltage required. Thus, by reducing the light emitting area, the power consumption can be considerably reduced.

Also, by reducing the light emitting area, the heat from the plane light emitter can be reduced. Thus, it is possible to reduce the influence from the heat to which the stage apparatus and a workpiece (for example, an object to be measured) set on the stage apparatus are subjected. Accordingly, heat deformation of the light transmittance plate and the workpiece can be reduced. When the stage apparatus is employed, for example, in a measuring instrument, the measurement accuracy can be improved.

Further, by making only the necessary portion to emit the light, compared to the case where the entire of a wide face is made to emit the light, glare can be restrained. Accordingly, operation using the stage apparatus can be facilitated.

Preferably in the above aspect of the present invention, the stage apparatus may further include a light reflection plate provided on an opposite side to the light transmittance plate interposing the plane light emitter.

Owing to this configuration, the light reflection plate reflects also the light, which is emitted toward the opposite side to the light transmittance plate; and thus, the entire light emitted from the plane light emitter can be oriented toward the light transmittance plate. Therefore, the luminance of the contour illumination is increased. Accordingly, for example, minute contour of the workpiece set on the light transmittance plate can be detected clearly.

In particular, the stage apparatus not only may preferably includes a light reflection plate provided on an opposite side to the light transmittance plate interposing the plane light emitter, in the stage apparatus, but also the plane light emitter may preferably be divided into a plurality of parts and light emission is controlled at each of the parts independently.

According to this configuration, even in joint areas of parts of the plane light emitter, transmitted illumination can be obtained owing to the light reflected by the light reflection plate. Accordingly, by dividing the plane light emitter into parts, in addition to the effects to reduce the power consumption and heat generation, the following remarkable effects can be obtained. That is, while dark areas are eliminated in the illuminated area, necessary portions of the workpiece set on the light transmittance plate can be appropriately illuminated.

A vision measuring apparatus, includes: a stage apparatus; an imaging device for imaging a workpiece set on the stage surface of the stage apparatus; a movement mechanism for moving the workpiece and the imaging device in three-dimensional directions; and an analyzing unit that analyzes the contour or dimensions of the workpiece based on image data taken by the imaging device.

Owing to this configuration, the analyzing unit analyzes the contour and dimensions of the workpiece based on the image data taken by the imaging device.

Since the stage apparatus can be formed large in size and the flatness of the stage surface is maintained, the vision measuring apparatus of the present invention is suitable for vision measuring of a large workpiece such as a large size display panel. Further, the stage surface is maintained to be a flat plane with high precision. Owing to this, in addition to the fact that the measurement accuracy is improved, since the imaging device, for example, requires only one time focus adjustment, the measuring efficiency is enhanced.

DETAILED DESCRIPTION OF PREFERRED EMBODIMENTS

Hereinafter, embodiments of the present invention will be illustrated and described with reference to the reference numerals given to each element.

First Embodiment

A first embodiment of a stage apparatus in accordance with the present invention will be described.

Figure 1:
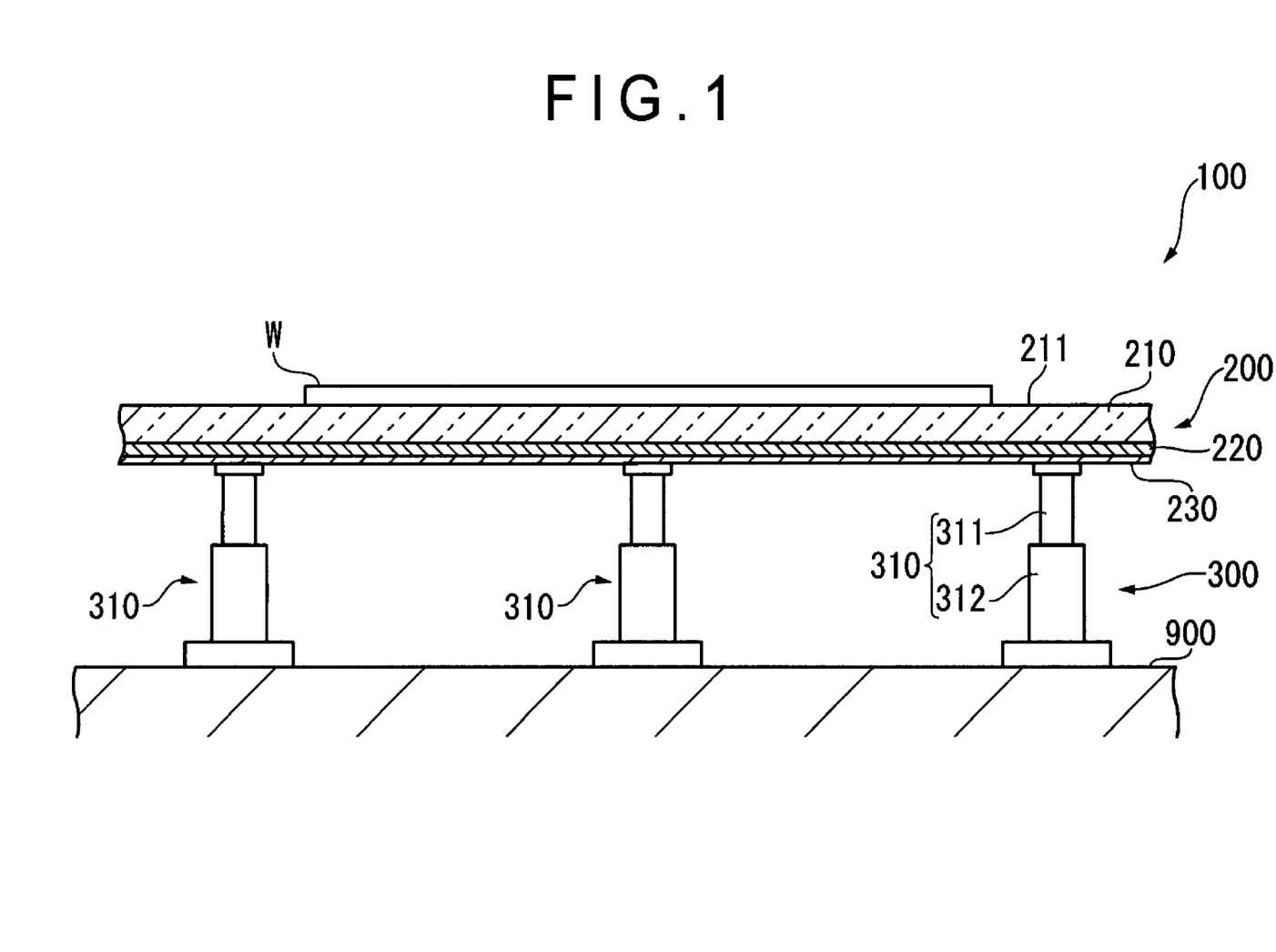
FIG. 1 is a sectional view of a stage apparatus in accordance with a first embodiment of the present invention.
Figure 2:
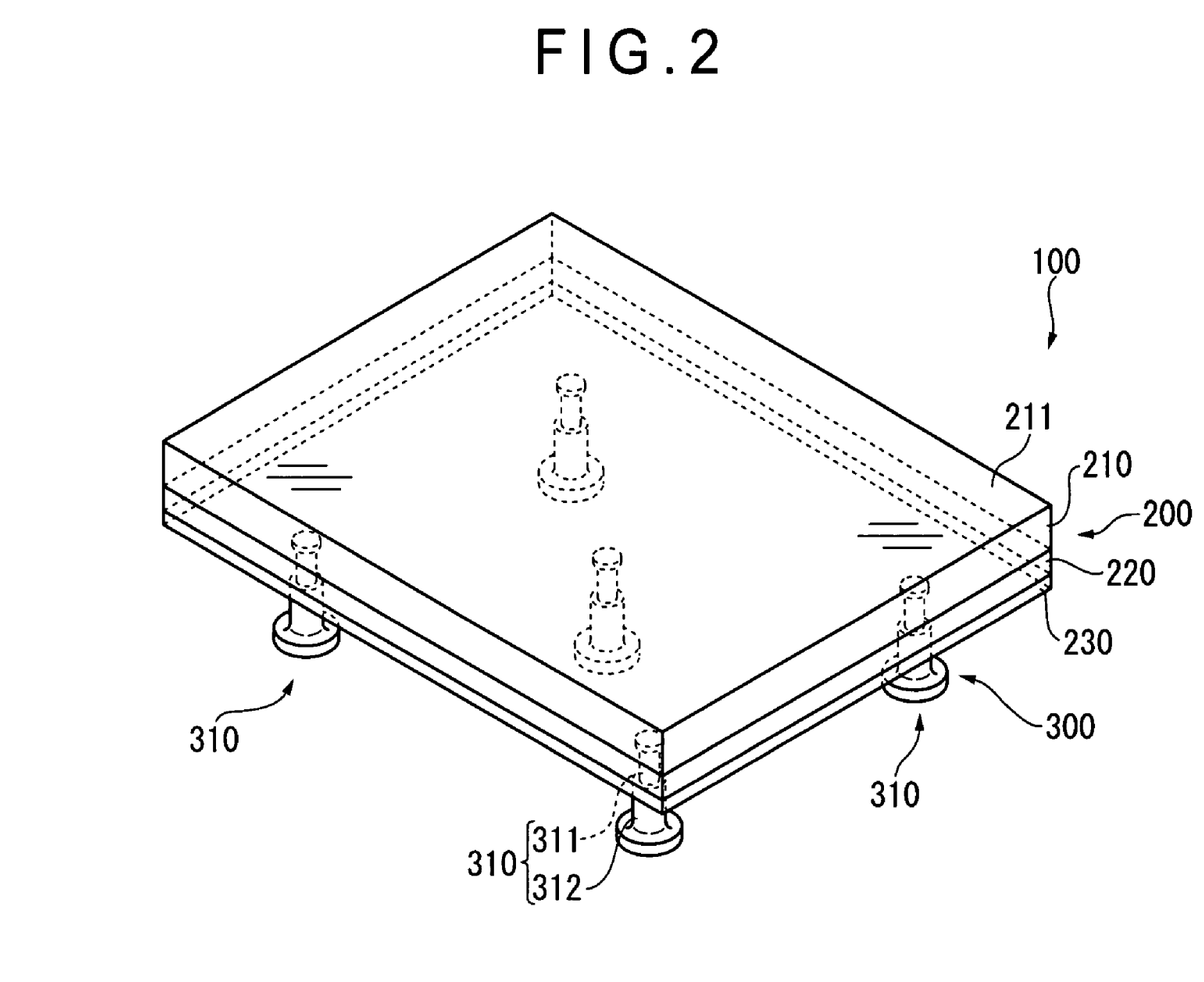
FIG. 2 is a perspective view of the first embodiment.

FIG. 1 is a sectional view of a stage apparatus; and FIG. 2 is a perspective view of the stage apparatus.

The stage apparatus 100 includes a stage section 200 on which a predetermined workpiece W is set up and which illuminates the workpiece W from the lower face side thereof, and a supporting section (flatness adjuster) 300 that supports the stage section 200 and adjusts flatness of the stage section 200.

The stage section 200 includes a stage glass (light transmittance plate) 210 having a stage surface 211 on the upper surface thereof, the stage surface 211 being processed into a flat plane, a plane light emitter 220, which is bonded to substantially all over the stage glass 210 at the lower surface of the stage glass 210, and a light reflection plate 230 bonded to the lower surface of the plane light emitter 220.

The stage glass 210 is a plate glass having a relatively large area of, for example, 2500 mm×2500 mm. The thickness is not required to be so large. For example, a thickness of approximately 10 mm to 25 mm will fit the purpose.

The plane light emitter 220 is formed of a light emitting material having a flat plane, which emits the light when a predetermined voltage is applied. As for such plane light emitter 220, for example, an organic or inorganic EL (electroluminescence) may be employed. The voltage is applied to the plane light emitter 220 from a predetermined drive circuit (not shown), which controls the light emitting of the plane light emitter 220.

The light reflection plate 230 is a thin plate for reflecting the light; thereby the light emitted from the plane light emitter 220 is reflected toward the stage glass 210.

The supporting section 300 includes a plurality of jacks (supporters) 310 evenly disposed under the lower surface of the light reflection plate 230. For example, in FIG. 2, the jacks 310 are disposed at the four corners and at the center of the stage section 200. Each of the jacks 310 includes a rod (support) 311 that is brought into contact with the lower surface of the light reflection plate 230 and supports the stage section 200, and a cylindrical holder 312 that holds the rod 311 movably in the vertical direction.

The stage apparatus 100 is installed on a predetermined fixed surface 900.

The operation of the first embodiment having such configuration will be described.

Before performing contour illumination against a predetermined workpiece W, first of all, the flatness of the stage surface 211 is checked. When the flatness of the stage surface 211 is out of allowable range because of a fact that, for example, the central area is hollow due to a deflection of the stage glass 210, the flatness of the stage glass 210 is adjusted by moving rods 311 of the jacks 310 in the vertical direction.

When the stage surface 211 has been adjusted to a flat plane free from unevenness or waviness, the workpiece W is set on the stage surface 211 and the plane light emitter 220 is energized to emit the light. Then, the workpiece W is illuminated with the contour illumination through the stage glass 210.

According to the first embodiment as described above, following effects are obtained.

(1) Since the flatness of the stage surface 211 can be adjusted using the jacks 310 of the supporting section 300, the stage surface 211 can be always maintained to be flat. Even when the stage glass 210 is arranged to be enlarged, by adjusting the flatness of the plane using the jacks 310, the flatness of the stage surface 211 can be maintained.

(2) Since the plane light emitter 220 is provided to substantially all over the lower surface of the stage glass 210, substantially entire surface of the stage glass 210 can be illuminated with the contour illumination, for example, without moving the illuminator. Accordingly, by eliminating the movement mechanism, cost for components and assembly process can be reduced.

Next, a stage apparatus in accordance with a second embodiment of the present invention will be described.

Basic configuration of the second embodiment is identical to that of the first embodiment, but is characterized in the configuration of a supporting section as a flatness adjuster.

Figure 3:
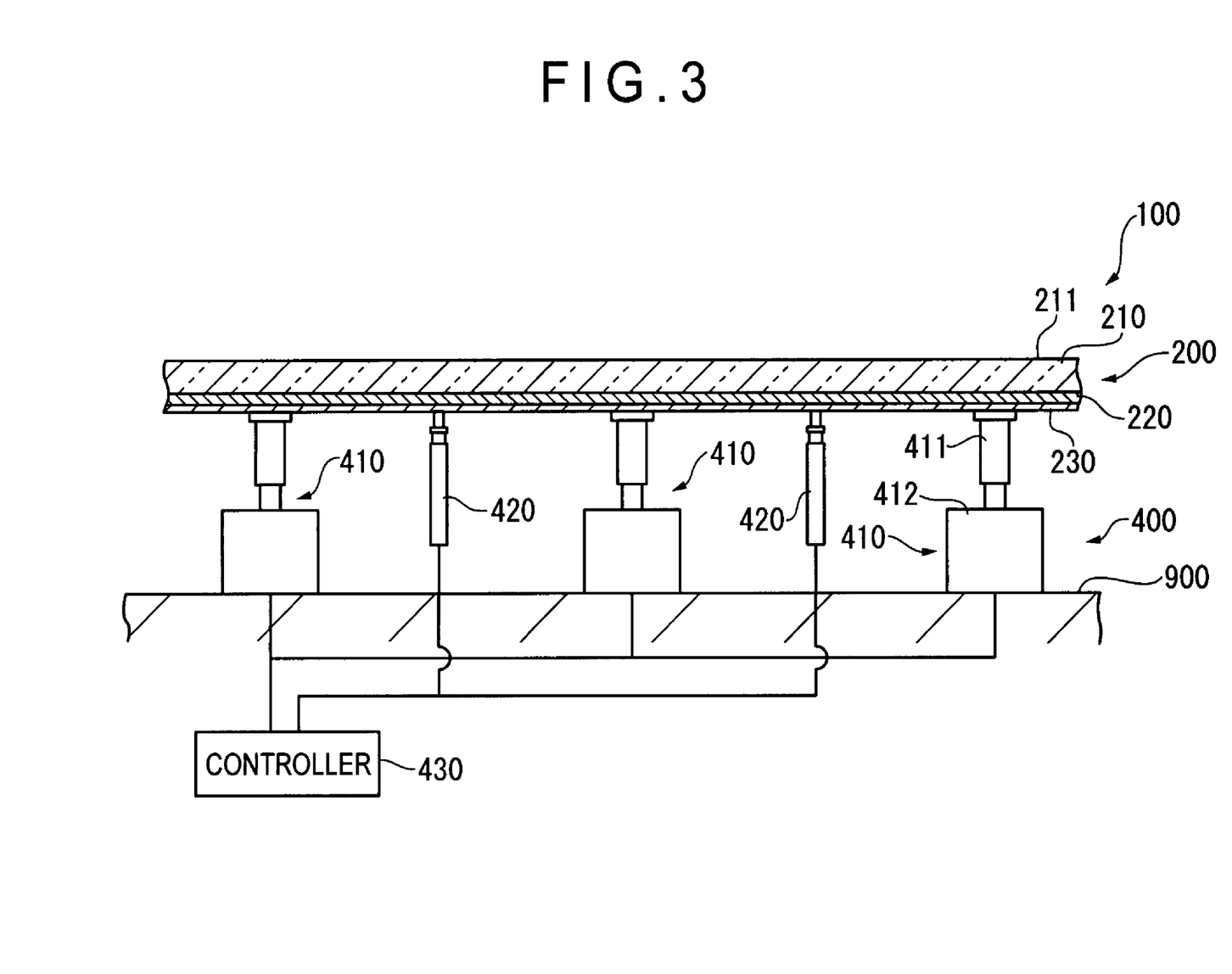
FIG. 3 is a sectional view of a stage apparatus in accordance with a second embodiment of the present invention.

FIG. 3 is a sectional view of the second embodiment. Referring to FIG. 3, a supporting section 400 includes a plurality of jacks 410 disposed at predetermined positions, displacement measurement devices (height detectors) 420 for measuring the amount of deflection of the stage section 200, which is disposed under the lower surface of the stage section 200 and a controller 430 for controlling vertical movement of the jacks 410 based on the measurement result of the displacement measurement devices 420.

The jack 410 includes a rod 411 for supporting the stage section 200 at a predetermined position and a drive section 412 for driving the rod in the vertical direction. The drive section 412 is constituted of, for example, a motor.

The displacement measurement device 420 is constituted of, for example, an electric micrometer. A plurality of the displacement measurement devices 420 are disposed at predetermined positions under the lower surface of the stage section 200.

In the above-described configuration, when a deflection or the like of the stage section 200 is measured by the displacement measurement devices 420, the controller 430 moves the rods 411 of the jacks 410 in the vertical direction based on the measurement result by the displacement measurement devices 420 to control the stage surface 211 to be a flat plane free from unevenness or waviness.

According to the second embodiment as described above, in addition to the effects of the first embodiment, the following effect is obtained.

(3) Based on the detection result by the displacement measurement devices 420, the controller 430 controls the vertical movement of the rod 411 so that the height at plural points of the stage section 200 is even with each other. Accordingly, flatness of the stage surface 211 is always maintained automatically.

Also, for example, in the stage glass 210 with a side length of 2500 mm, the amount of hollow reaches to an extent of 0.8 to 1.8 mm in its central area, and thereby it is difficult to adjust the jacks 410 manually. Since the jacks 410 are automatically driven and controlled by the controller 430, flatness of the stage surface 211 can be adjusted precisely.

Next, a stage apparatus according to a third embodiment of the present invention will be described.

Basic configuration of the third embodiment is identical to that of the first embodiment, but is characterized in the configuration of a flatness adjuster.

Figure 4:
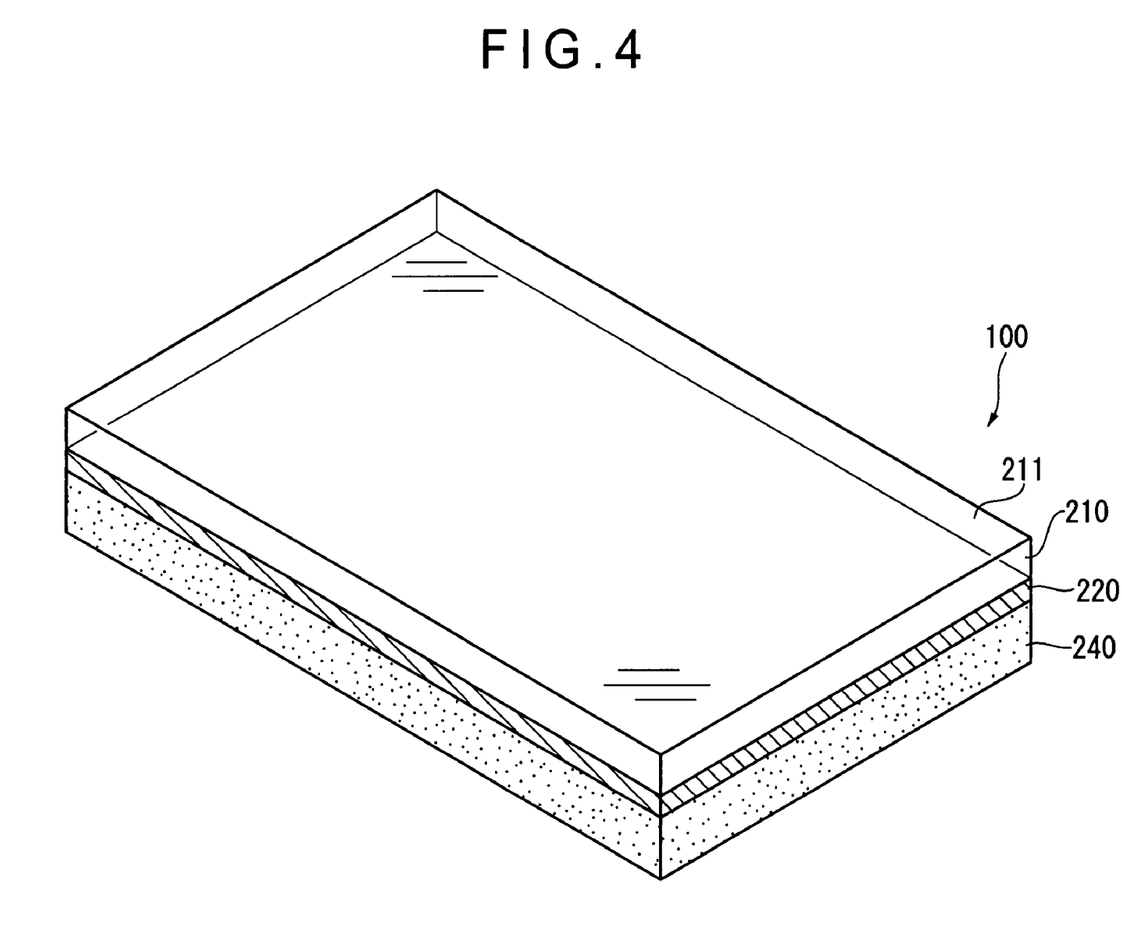
FIG. 4 is a perspective view of a stage apparatus in accordance with a third embodiment of the present invention.

Referring to FIG. 4, a stage apparatus 100 includes a stage glass 210, a plane light emitter 220 bonded to the lower surface of the stage glass 210 and a base plate 240 bonded to the lower surface of the plane light emitter 220.

The base plate 240 is made of a hard plate material; for example, a granite surface plate is given as an example. The base plate 240 functions as a light reflection plate for reflecting the light from the plane light emitter 220 toward the stage glass 210 as well as a flatness adjuster for maintaining the flatness of the stage glass 210.

According to the third embodiment as described above, in addition to the effects of the above embodiments, the following effect can be obtained.

(4) Owing to the rigidity of the base plate 240, the stage glass 210 is given with rigidity; thus, the flatness of the stage surface 211 is maintained. And, since the rigidity is given to the stage glass 210 by the base plate 240, the stage surface 211 can be processed to a high precision flat plane.

(Modification 1)

Next, a vision measuring apparatus utilizing a stage apparatus will be described as a modification 1 of the present invention.

Figure 5:
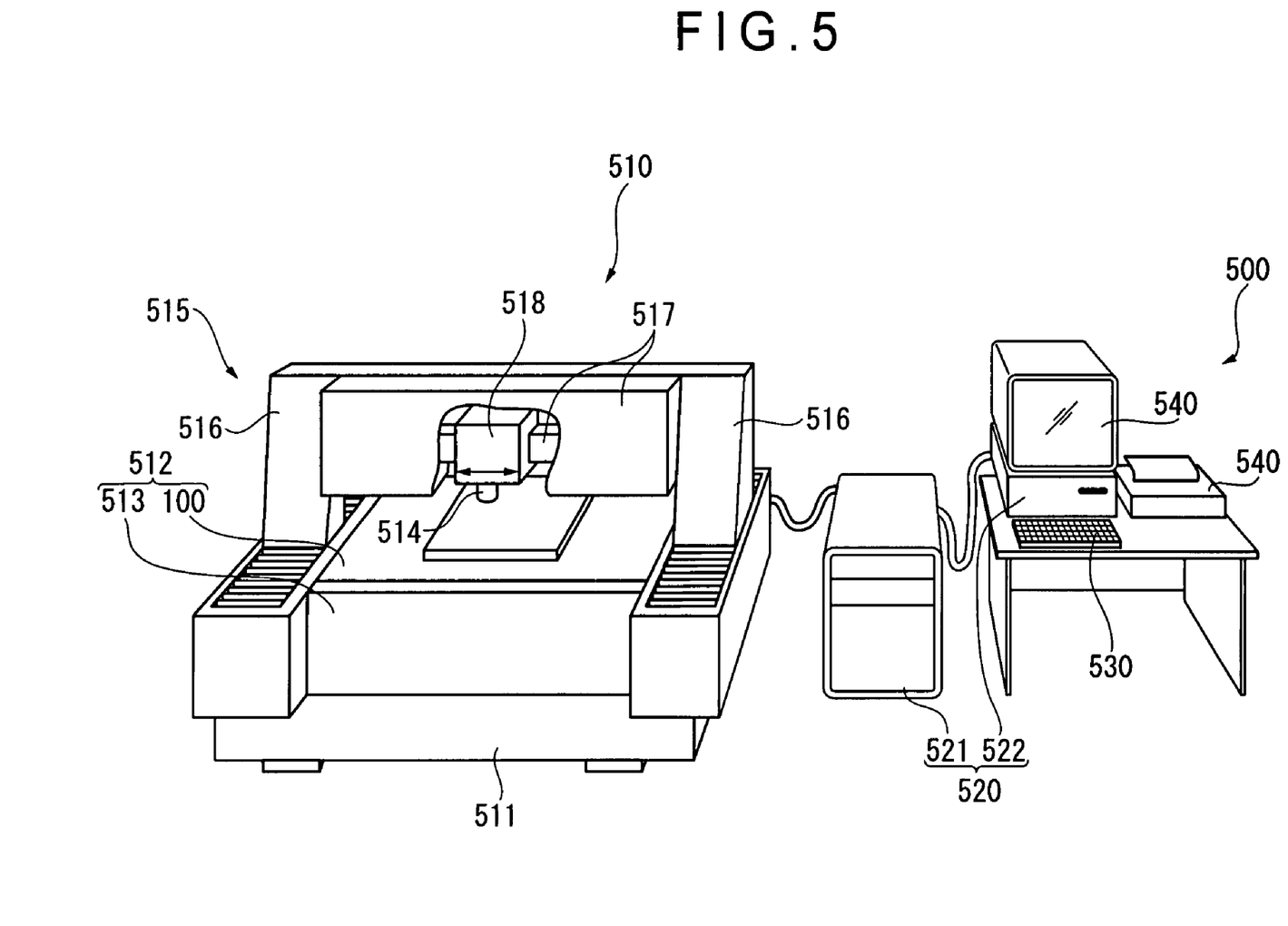
FIG. 5 is an illustration showing a configuration of a modification 1 of the present invention.

FIG. 5 shows a configuration of a vision measuring system 500 as a vision measuring apparatus.

The vision measuring system 500 includes a vision measuring machine 510, a control unit 520, an input unit 530 and an output unit 540.

The vision measuring machine 510 includes a console table 511, which serves as a base, a stage section 512 disposed on the console table 511 on which a workpiece W is set, an imaging device 514 for imaging the workpiece W and a movement mechanism 515 that moves the imaging device 514 and the workpiece W in the three-dimensional directions.

The stage section 512 includes a base 513 having a receiving space opened upwardly and a stage apparatus 100 provided in the receiving space on the base 513.

As for the stage apparatus 100, one of the stage apparatus, which has been described so far in the first, second and third embodiments, may be utilized.

As for the imaging device 514, for example, a CCD camera may be employed.

The movement mechanism 515 includes beam supporters 516 and 516, which are provided vertically on the both side edges of the base 513 so as to be movable forward and backward, an X-beam 517 supported by the upper ends of the beam supporters 516 and 516, and a Z-slider 518 disposed in the X-beam 517 so as to be slidable thereon.

Being pendent vertically from the Z-slider 518, the imaging device 514 is attached to the front end of the Z-slider 518.

Figure 6:
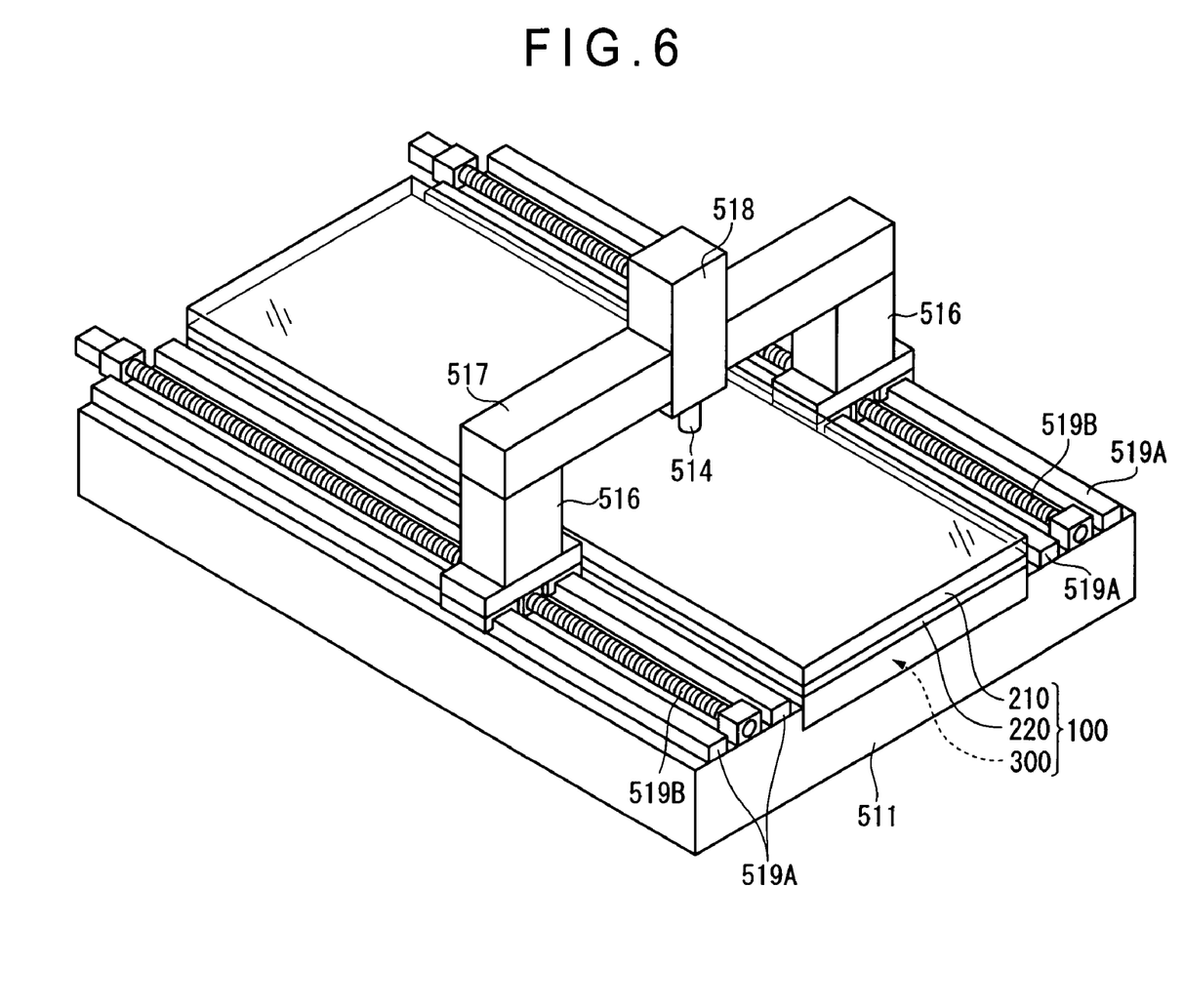
FIG. 6 is an illustration showing an internal structure to slide a beam support in the modification 1.

Here, as for the configuration to provide the beam supporters 516 and 516 to be movable along the sides of the base 513 (in the Y-direction), the following configuration is given as an example. That is, as shown in FIG. 6 showing internal structure, the beam supporters 516 are supported by guide rails 519A on the both sides of the console table 511, and engaged with lead screws 519B to move the beam supporters 516. Note that such a configuration may be employed that the beam supporters 516 and 516 are fixed to the base 513, and the stage apparatus 100 slides to move within the receiving space (in the Y-direction).

The control unit 520 includes a motion controller 521 that controls the movement of the movement mechanism 515 and a host computer 522 that analyzes the contour and dimensions of the workpiece W based on the image data taken by the imaging device 514.

Note that the motion controller 521 may be adapted to control the jacks (310, 410) of the stage apparatus 100 to adjust the flatness of the stage surface 211, or to control the voltage to be applied to the plane light emitter 220 to control the light emission of the plane light emitter 220.

As the input unit 530, a keyboard or the like is given as an example; and as the output unit, a monitor, a printer or the like is given as an example.

The operation of the modification 1 with such configuration will be described.

First of all, a workpiece W is set on the stage surface 211 of the stage apparatus 100. Owing to the flatness adjuster (supporting section), the flatness of the stage surface 211 is adjusted to be a flat plane free from unevenness or waviness.

In this state, contour illumination is performed from the lower surface of the workpiece W by light emission of the plane light emitter 220 through the stage glass 210.

Through an operation control by the motion controller 521, the movement mechanism 515 is driven and the imaging device 514 is moved in accordance with the area to be measured in the workpiece W. And then, the imaging device 514 takes images of the workpiece W.

The analyzing unit (not shown) of the host computer 522 analyzes the image data, and the contour and dimensions of the workpiece W are output through the output unit 540.

According to the modification 1 configured as described above, in addition to the effects of the embodiments described so far, the following effect can be obtained.

(5) Since it is possible to form a large stage apparatus 100 and the flatness of the stage surface 211 is maintained, vision measuring of a large workpiece W, for example, of a large display panel can be performed. And since the stage surface 211 is maintained to be a highly precise flat plane in addition to the fact that the measurement accuracy is increased, the focus adjustment of the imaging device 514 requires only once. As a result, the measuring efficiency is enhanced.

The present invention is not limited to the above-described embodiments. Any modifications, improvements within a range where the object of the present invention is attained should be included in the present invention.

For example, in addition to an inorganic glass, the light transmittance plate may be formed from an organic glass.

Figure 7:
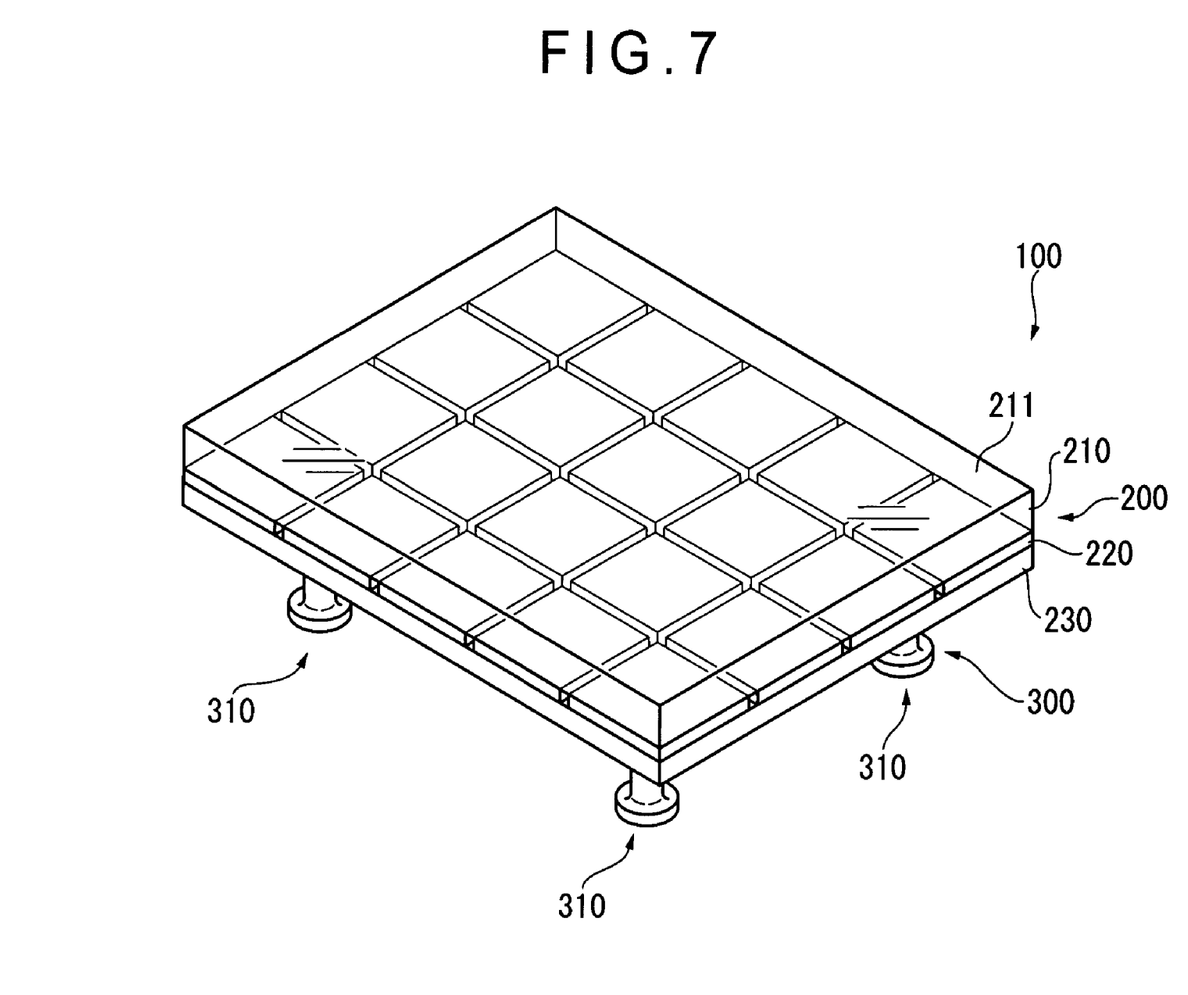
FIG. 7 is an illustration showing a stage apparatus as a modification of the present invention, in which a plane light emitter is divided into a plurality of parts.

Also, the following configuration may be employed. That is, the stage glass, the plane light emitter and the light reflection plate may be divided into a plurality of parts of tile shapes, and the control of the light emission by the plane light emitter and the control of the height adjustment by the jacks are carried out for each part independently. When the plane light emitter is divided into a plurality of parts as shown in FIG. 7, it is preferred to provide a light reflection plate at the opposite side to the stage glass interposing the plane light emitter in order to prevent dark area generated in the joint area between the parts.

As a modification, there is given an example in which the stage apparatus is incorporated with the vision measuring apparatus. It is needless to say that, in addition to the above, the stage apparatus may be incorporated with, for example, an optical measuring instrument such as a microscope or the like.

The priority application Number JP2004-174353 upon which this patent application is based is hereby incorporated by reference.

What is claimed is:

1. A stage apparatus, comprising:
    a light transmittance plate having on an upper surface side a stage surface of a substantially flat plane on which a predetermined workpiece is set;
    a plane light emitter that is self-luminous and has a flat plane provided substantially all over a lower surface of the light transmittance plate to illuminate the workpiece with contour illumination through the light transmittance plate; and
    a flatness adjuster that supports a lower face side of the plane light emitter at a plurality of points and adjusts the flatness of the stage surface by adjusting the height at a plurality of supporting points.

2. The stage apparatus according to claim 1, wherein the flatness adjuster is a plurality of supporters disposed at a plurality of predetermined positions on a lower face side of the plane light emitter and having supports capable of moving in a vertical direction.

3. The stage apparatus according to claim 1,
    the flatness adjuster including:
    a plurality of height detectors that detect the height at a plurality of predetermined points on the lower face side of the plane light emitter; and
    a controller that controls the height at the plurality of predetermined points supporting the lower face side of the plane light emitter based on a detection result by the height detectors.

4. The stage apparatus according to claim 1, wherein the plane light emitter is divided into a plurality of parts and light emission is controlled at each of the parts independently.

5. The stage apparatus according to claim 1, further comprising a light reflection plate provided on an opposite side to the light transmittance plate interposing the plane light emitter.

6. The stage apparatus according to claim 1,
    the plane light emitter is formed of a light emitting material, which emits the light when a predetermined voltage is applied.

7. The stage apparatus according to claim 6, the plane light emitter is an electroluminescent light emitting material.

8. A vision measuring apparatus, comprising:
    a stage apparatus;
    an imaging device for imaging a workpiece set on the stage surface of the stage apparatus;
    a movement mechanism for moving the workpiece and the imaging device in three-dimensional directions; and
    an analyzing unit that analyzes the contour or dimensions of the workpiece based on image data taken by the imaging device,
    the stage apparatus including:
    a light transmittance plate having on an upper surface side a stage surface of a substantially flat plane on which a predetermined workpiece is set;
    a plane light emitter that is self-luminous and has a flat plane provided substantially all over a lower surface of the light transmittance plate to illuminate the workpiece with contour illumination through the light transmittance plate; and
    a flatness adjuster that supports a lower face side of the plane light emitter at a plurality of points and adjusts the flatness of the stage surface by adjusting the height at a plurality of supporting points.

* * * * *